United States Patent
Kurosawa

(10) Patent No.: US 9,456,091 B2
(45) Date of Patent: Sep. 27, 2016

(54) DEVICES AND METHODS FOR PERFORMING OPERATIONS ON IMAGE DATA STORED IN AN EXTERNAL STORAGE DEVICE

(71) Applicant: CANON KABUSHIKI KAISHA, Tokyo (JP)

(72) Inventor: Takahiro Kurosawa, Kunitachi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/328,628

(22) Filed: Jul. 10, 2014

(65) Prior Publication Data

US 2014/0320683 A1    Oct. 30, 2014

Related U.S. Application Data

(63) Continuation of application No. 12/247,843, filed on Oct. 8, 2008, now Pat. No. 8,804,143.

(30) Foreign Application Priority Data

Oct. 19, 2007 (JP) .................................. 2007-273090

(51) Int. Cl.
| | |
|---|---|
| *G06F 3/12* | (2006.01) |
| *H04N 5/225* | (2006.01) |
| *H04N 1/00* | (2006.01) |
| *H04N 5/232* | (2006.01) |
| *H04N 5/77* | (2006.01) |
| *H04N 7/18* | (2006.01) |

(52) U.S. Cl.
CPC .......... *H04N 1/00129* (2013.01); *H04N 1/001* (2013.01); *H04N 1/00204* (2013.01); *H04N 1/00408* (2013.01); *H04N 1/00442* (2013.01); *H04N 1/00453* (2013.01); *H04N 1/00461* (2013.01); *H04N 5/23206* (2013.01); *H04N 5/77* (2013.01); *H04N 7/185* (2013.01); *H04N 1/00347* (2013.01); *H04N 2201/0013* (2013.01); *H04N 2201/0049* (2013.01); *H04N 2201/0084* (2013.01); *H04N 2201/0087* (2013.01)

(58) Field of Classification Search
None
See application file for complete search history.

(56) References Cited

U.S. PATENT DOCUMENTS

| | | | |
|---|---|---|---|
| 2002/0109859 A1 | 8/2002 | Tipirneni | |
| 2005/0041035 A1* | 2/2005 | Nagatomo et al. | ........... 345/601 |

(Continued)

FOREIGN PATENT DOCUMENTS

| | | |
|---|---|---|
| JP | 2002-158936 A | 5/2002 |
| JP | 2004-274245 A | 9/2004 |

(Continued)

OTHER PUBLICATIONS

Japanese Office Action for Appln. No. 2007-273090 dated Sep. 26, 2011.

*Primary Examiner* — Thomas Lett
(74) *Attorney, Agent, or Firm* — Carter, DeLuca, Farrell & Schmidt, LLP

(57) ABSTRACT

A technique of directly and simply operating image data stored in an external storage device using a camera is provided. To accomplish this, an image processing device connectable to a network, comprises a connection unit configured to connect to an imaging device, an acquisition unit configured to acquire image data captured by the imaging device from an external device on the network, in accordance with a user operation on the imaging device, and a display control unit configured to display the image data acquired by the acquisition unit and image data stored in the imaging device in accordance with a display unit of the imaging device.

6 Claims, 18 Drawing Sheets

(56) References Cited

U.S. PATENT DOCUMENTS

2006/0263078 A1 11/2006 Misawa
2007/0043792 A1 2/2007 O'Brien
2008/0064377 A1 3/2008 Mori

FOREIGN PATENT DOCUMENTS

| JP | 2004-304488 A | 10/2004 |
| JP | 2005-123922 A | 5/2005 |
| JP | 2005-313392 A | 11/2005 |

* cited by examiner

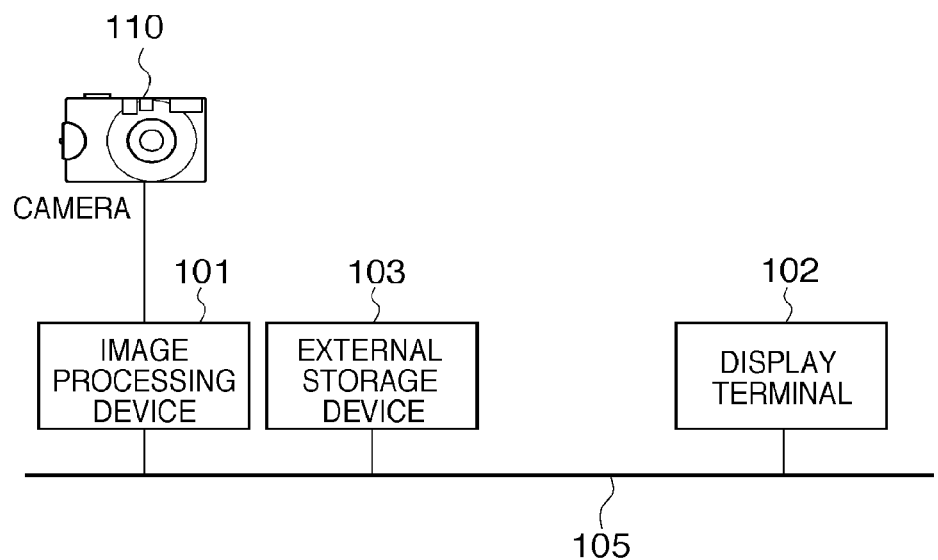
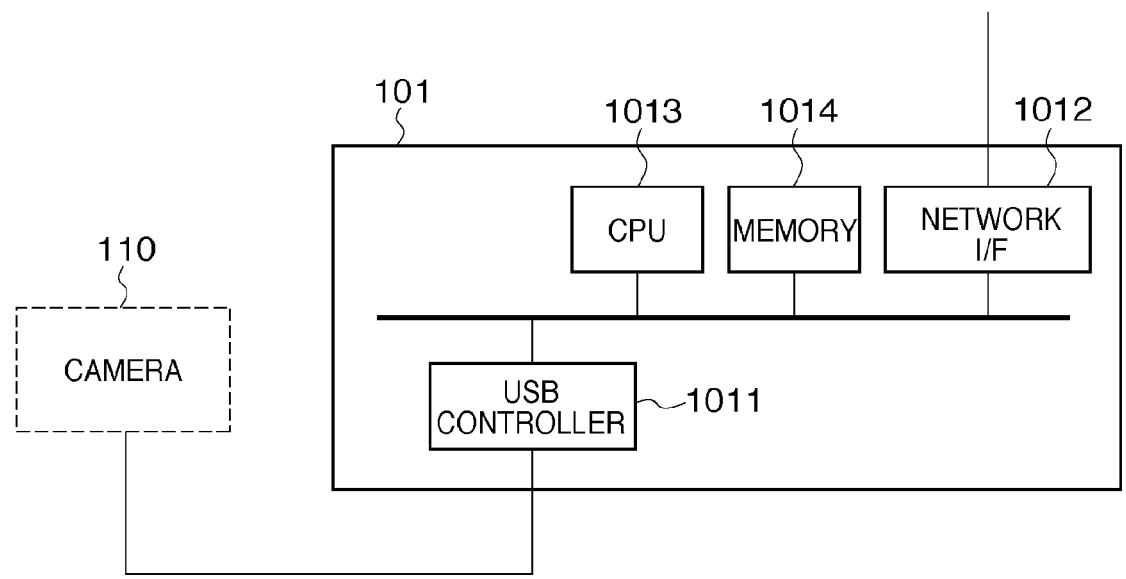

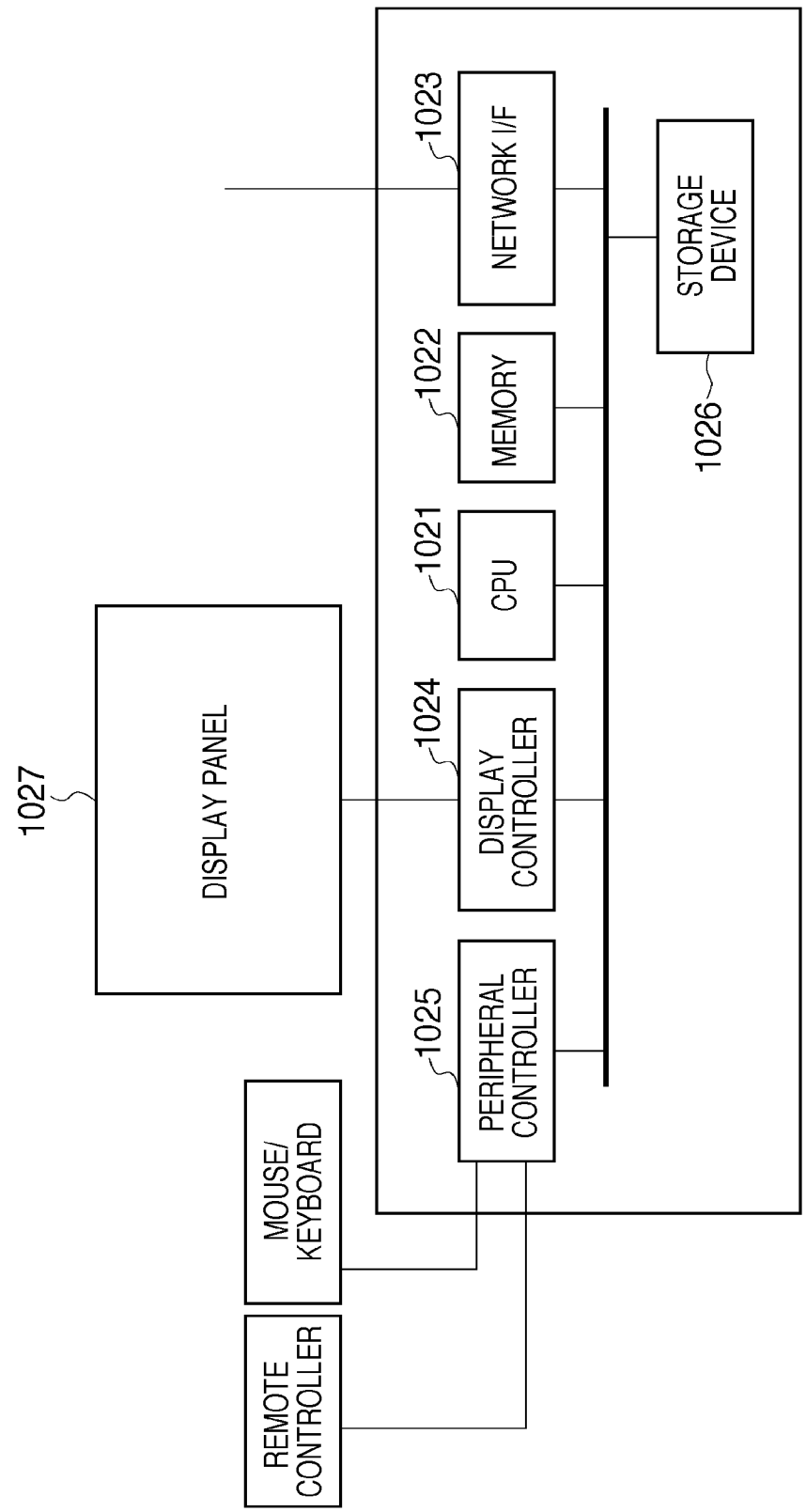

DEVICES AND METHODS FOR PERFORMING OPERATIONS ON IMAGE DATA STORED IN AN EXTERNAL STORAGE DEVICE

CROSS REFERENCE TO RELATED APPLICATIONS

This application is a continuation of U.S. patent application Ser. No. 12/247,843 filed Oct. 8, 2008, which claims the benefit of and priority to Japanese Patent Application No. 2007-273090 filed Oct. 19, 2007, each of which are hereby incorporated by reference herein in their entirety.

BACKGROUND OF THE INVENTION

1. Field of the Invention

The present invention relates to an image processing device and an imaging device, and a method and program for controlling these devices.

2. Description of the Related Art

Conventionally, there is a technique of transferring image data included in a camera to a connected device, such as a printer, a PC or the like, by directly operating the camera. In particular, a procedure for transmitting and receiving image data when a printer and a camera are connected to each other is standardized as "PictBridge" by the Camera and Imaging Products Association (CIPA). Some cameras have a specific button for using the PictBridge function.

Moreover, an attempt has been made to create functions that can be performed by direct connection with a camera, in addition to simple printing via connection to a printer (Japanese Patent Laid-Open Nos. 2005-123922 and 2005-313392).

Incidentally, an input/output means for an external storage device on a network is called a network storage or a distributed file system. Examples of such a means include the Network File System (NFS) employed in a UNIX (registered trademark)-based network and the Common Internet File System (CIFS) employed in a Windows (registered trademark)-based network. The Server Message Block (SMB) protocol, and the Web-based Distributed Authoring and Versioning (WebDAV), which is defined as an expanded WWW technique on the Internet, are also included therein.

Moreover, the Digital Living Network Alliance (DLNA) provides specifications, assuming that image/audio distribution is used on a home network. The DLNA strictly defines an image/audio codec and a media transfer protocol based on the UPnP specifications (including the UPnP AV specifications) so as to improve connectivity.

The DLNA's home network connection technique is directed to distribution of images and audio stored in an HDD recorder or a PC's storage device (storage). The DLNA defines the specifications of a media server device for providing image data, a media renderer device for reproducing and displaying image data, and the like. In addition, a media player device obtained by adding a control point function to the media renderer device is also defined by the DLNA.

However, it is not easy to directly operate image data stored in an external storage device using a camera. Particularly, in recent years, when a large amount of image data captured by a camera is stored in an external storage device, it is more difficult to operate the image data using the camera since the storage capacity of the camera is smaller than that of the external storage device.

SUMMARY OF THE INVENTION

The present invention can directly and easily operate image data stored in an external storage device using an imaging device.

According to one aspect of the present invention, an image processing device connectable to a network, comprises:

a connection unit configured to connect to an imaging device;

an acquisition unit configured to acquire image data captured by the imaging device from an external device on the network, in accordance with a user operation on the imaging device; and a display control unit configured to display the image data acquired by the acquisition unit and image data stored in the imaging device to a display unit of the imaging device in a form that allows acquisition sources thereof to be identified.

According to another aspect of the present invention, a method for controlling an image processing device connected to a network and an imaging device, comprises:

acquiring image data captured by the imaging device from an external device on the network, in accordance with a user operation on the imaging device; and displaying the acquired image data in the acquiring step and image data stored in the imaging device to a display unit of the imaging device in a form that allows acquisition sources thereof to be identified.

According to still another aspect of the present invention, a computer-readable storage medium containing computer-executable instructions for controlling an image processing device connected to a network and an imaging device, the medium comprises:

computer-executable instructions for acquiring image data captured by the imaging device from an external device on the network, in accordance with a user operation on the imaging device; and computer-executable instructions for displaying the acquired image data in the acquiring step and image data stored in the imaging device to a display unit of the imaging device in a form that allows acquisition sources thereof to be identified.

Further features of the present invention will become apparent from the following description of exemplary embodiments with reference to the attached drawings.

BRIEF DESCRIPTION OF THE DRAWINGS

FIG. 1 is a diagram showing an example system employing an image processing device according to a first embodiment of the present invention.

FIG. 2 is a diagram showing an exemplary hardware configuration of the image processing device.

FIG. 3 is a diagram showing an exemplary hardware configuration of a display terminal.

DESCRIPTION OF THE EMBODIMENTS

Figure 4:
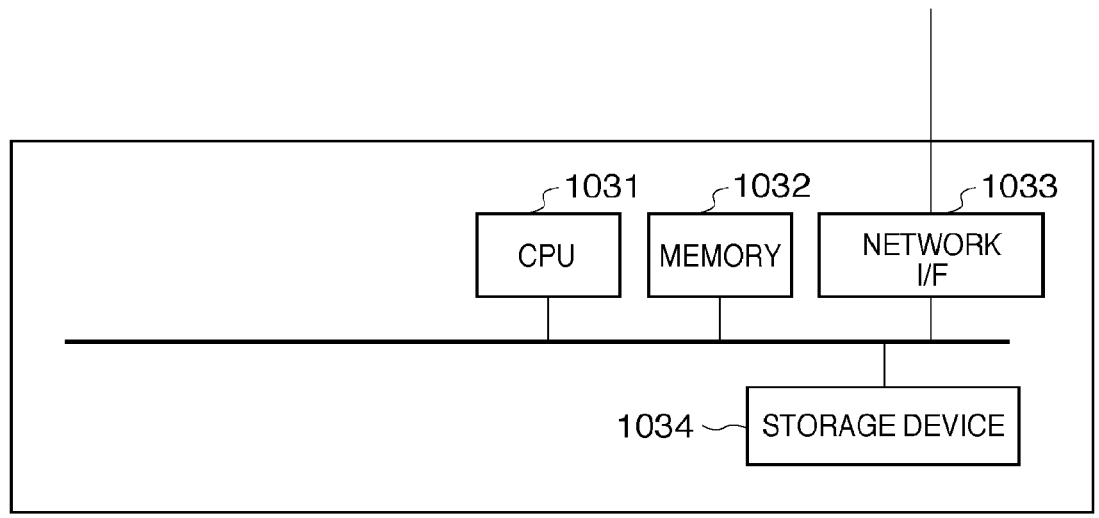
FIG. 4 is a diagram showing an exemplary hardware configuration of an external storage device.

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

An image processing device according to a first embodiment of the present invention and a camera as an imaging device will be described. This embodiment relates to a camera that handles an image on a network, and provides a technique of enabling an image on a network to be directly operated using a camera in a manner similar to that for an image stored in the camera. The image processing device enables an image stored in an external storage device, such as a storage or the like, to be displayed on the camera in a manner similar to that for an image stored in the camera, and enables the image displayed on the camera to be transmitted to other devices (e.g., a TV, a printer, a storage, or itself or other cameras) on the network.

The image processing device of this embodiment, particularly when image data stored in an external storage device is operated using the camera, can be operated by an operating method similar to that is used when image data stored in the camera is operated using the camera.

In this embodiment, an example in which the image processing device provided on the network transmits image data stored in the camera and image data stored in an external storage device to a display terminal (display) in similar manners.

Particularly, in this case, this embodiment is characterized in that a camera user interface, such as a display panel, a button, a zoom lever or the like, of the camera connected to the image processing device is used to perform an operation, such as selection, transmission, printing or the like, with respect to image data to be operated.

Note that, in embodiments described herein, high-definition photograph data (still image), music data, conversational speech data and the like as well as video data (motion picture) are collectively referred to as image data.

FIG. 1 is a diagram showing a typical usage configuration of this embodiment including an image processing device 101, a display terminal 102, an external storage device 103, and an imaging device 110.

The camera 110 and the image processing device 101 are connected to each other via a Universal Serial Bus (USB). The image processing device 101, the display terminal 102, and the external storage device 103 are each connected to a network. In this configuration, an operation that is performed on the camera 110 by the user is received by the image processing device 101. Image data stored in the camera 110 is then transmitted to the display terminal 102 by control of the image processing device 101. The display terminal 102 then displays the camera image.

The network 105 of FIG. 1 may be an intranet provided in a company or an organization, or the Internet. The network may also be a home network to which a home device is connected, or may be a network to which an outdoor device is connected. The network may also provide wireless connection, such as IEEE 802.11, bluetooth (registered trademark) or the like. The network may also provide wired connection, such as a power line that is also used for data transmission (Power Line Communications), IEEE 802.3 (Ethernet (registered trademark)) or the like. Connection between the camera 110 and the image processing device 101 is not limited to USB. A device connection network, such as IEEE 1394, UWB or the like, may be used.

FIG. 2 shows an exemplary hardware configuration of the image processing device 101. The image processing device 101 includes a USB controller 1011 that is connected to a camera and is used for transmitting and receiving image data and controlling the camera, a network I/F 1012 for network connection, a CPU 1013 for executing various processes in accordance with a program, and a memory 1014 for storing the program or processed data. The USB controller functions as a camera connecting means or a camera image acquiring means. The USB controller also functions as an external image acquiring means for acquiring image data stored in an external storage device, an instruction acquiring means for acquiring an instruction from the camera, and a display control means.

Note that the memory 1014 may include a high-speed RAM, an HDD device, a non-volatile memory (e.g., a flash memory), or a removable storage device. The network I/F may include either a wired interface or a wireless interface. The interface for connection with the camera is not limited to USB and may be IEEE 1394. The same is true of the memory and the network I/F.

FIG. 3 is a diagram showing an exemplary hardware configuration for operating the display terminal 102. The hardware configuration includes a CPU 1021 for executing various processes in accordance with a program, a memory 1022 for storing the program or processed data, a network I/F 1023 for network connection, and a display controller 1024 for reproducing and displaying a process result or image data on a display panel 1027. The hardware configuration further includes a peripheral controller 1025 for controlling a peripheral device that is used by the user to enter an input, and a storage device 1026 for assisting the memory and storing image data or various pieces of information.

As an example of the peripheral device controlled by the peripheral controller 1025, a keyboard or a mouse is illustrated. Alternatively, the controlled peripheral device may be an infrared remote controller, an LED controller, or an external sensor input/output controller.

FIG. 4 is a diagram showing an exemplary hardware configuration of the external storage device 103. The external storage device 103 includes a CPU 1031 for executing various processes in accordance with a program, a memory 1032 for storing the program or processed data, a network I/F 1033 for connecting to the network, and a storage device 1034 for assisting the memory and storing image data or various pieces of information.

The storage device in the external storage device 103 may be a large-capacity HDD device, a non-volatile memory (e.g., a flash memory) or the like. The storage device may include a RAID (Redundant Arrays of Inexpensive Disks) configuration or a retrieval accelerator.

Figure 5:
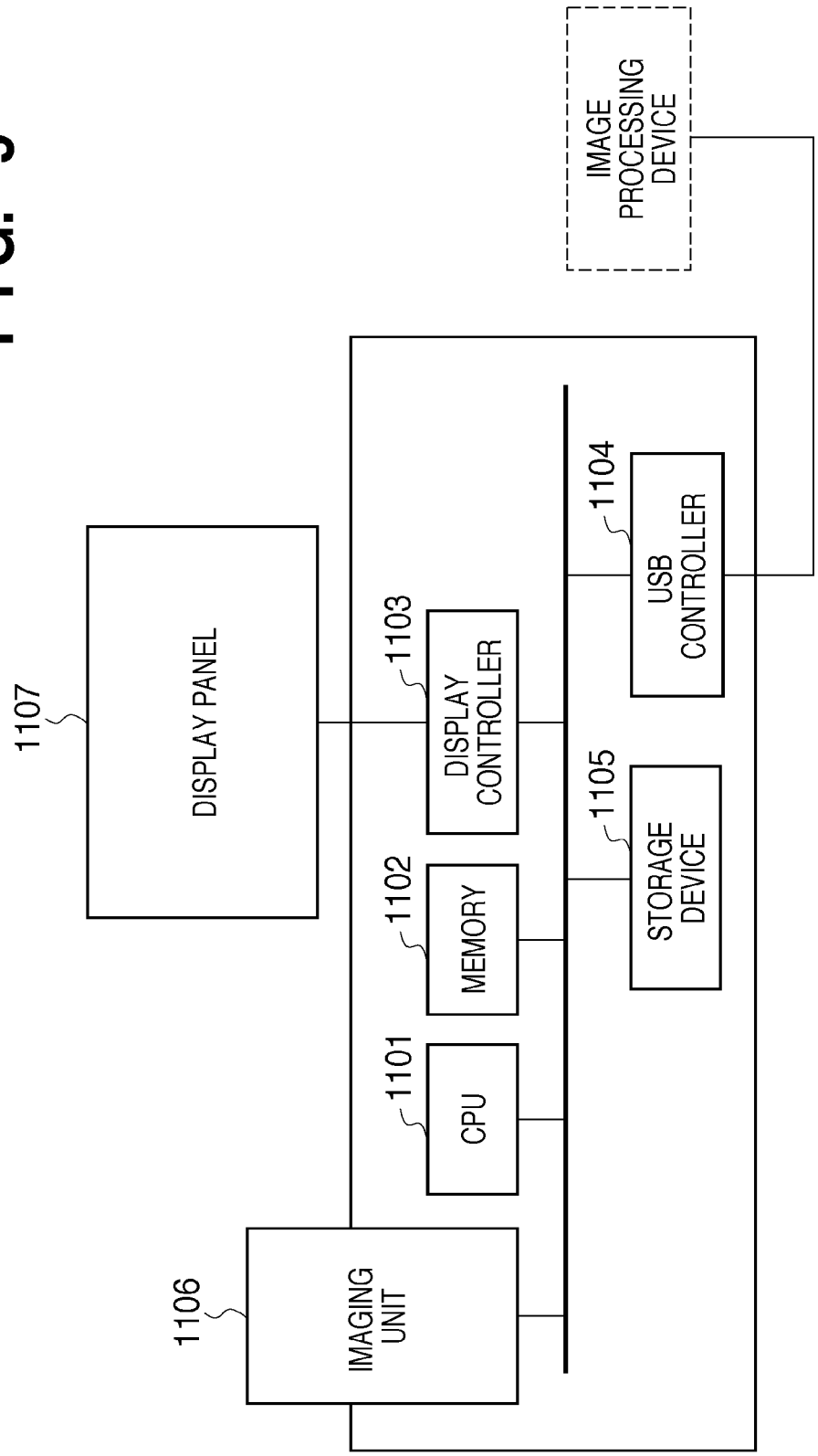
FIG. 5 is a diagram showing an exemplary hardware configuration of a camera.

FIG. 5 is a diagram showing an exemplary hardware configuration of the camera 110. The camera 110 includes a CPU 1101 for executing various processes in accordance with a program, a memory 1102 for storing the program or processed data, and a display controller 1103 for reproducing and displaying a process result or image data on a display panel 1107. The camera 110 further includes a USB controller 1104 for connecting to an external device, such as an image processing device or a PC device, a storage device 1105 for assisting the memory and storing image data or various pieces of information, and an imaging unit 1106 including a lens, a lens drive system, an optical sensor and the like.

Figure 6:
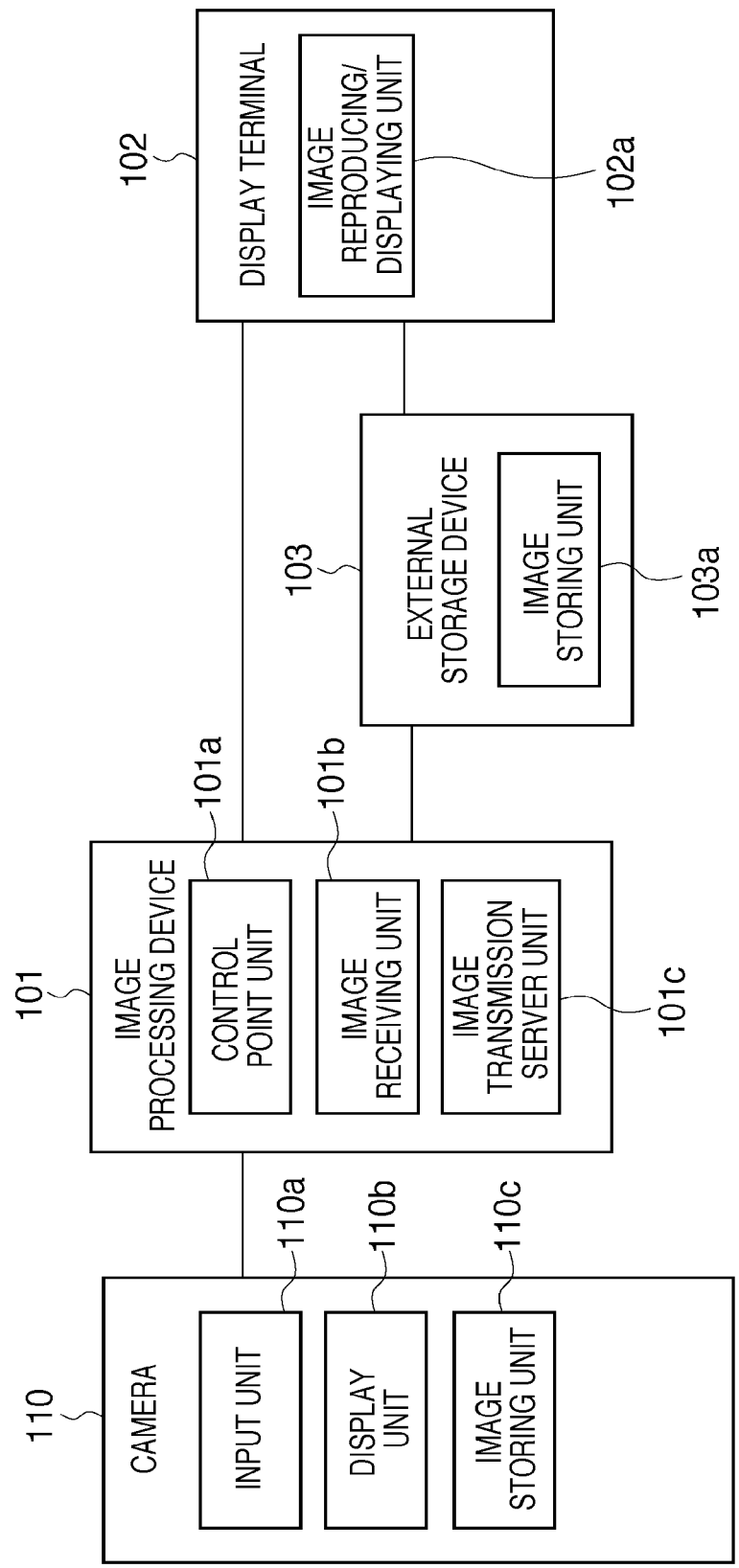
FIG. 6 is a diagram schematically showing a program configuration.

FIG. 6 is a diagram schematically showing a functional configuration of each device in the system. The image processing device 101 includes a control point unit 101a for controlling the image processing device 101 and the camera 110 in accordance with a user's input in the camera 110, an image transmission server unit 101c for performing image transmission, and an image receiving unit 101b for performing image reception.

The display terminal 102 includes an image reproducing/displaying unit 102a for controlling reproduction and displaying of an image. The external storage device 103 includes an image storing unit 103a for storing, retrieving and referencing image data. The camera 110 includes an input unit 110a for accepting a button operation or the like by the user, a display unit 110b for controlling displaying of image data on a display panel 1107 of the camera 110, and an image storing unit 110c for storing image data captured by the camera to the storage device of the camera 110. Note that the image storing unit 110c has a function of providing image data stored in the storage device of the camera 110 in response to a request from the image transmission server unit of the image processing device 101 or the display unit of the camera 110.

A program for controlling the functional units of each device is stored in the memory or the storage device of the device, and is executed by the CPU of the device. The program is used, as required, to control a network I/F, a USB interface, or various controllers.

With this configuration, the control point unit of the connected image processing device 101 is controlled, depending on a user operation input from the input unit of the camera 110, thereby processing image data stored in the camera and image data stored in the external storage device 103. Also, depending on a user operation input from the input unit of the camera 110, the display unit of the camera 110 outputs image data to the display terminal 102, which in turn displays the image data.

Figure 7:
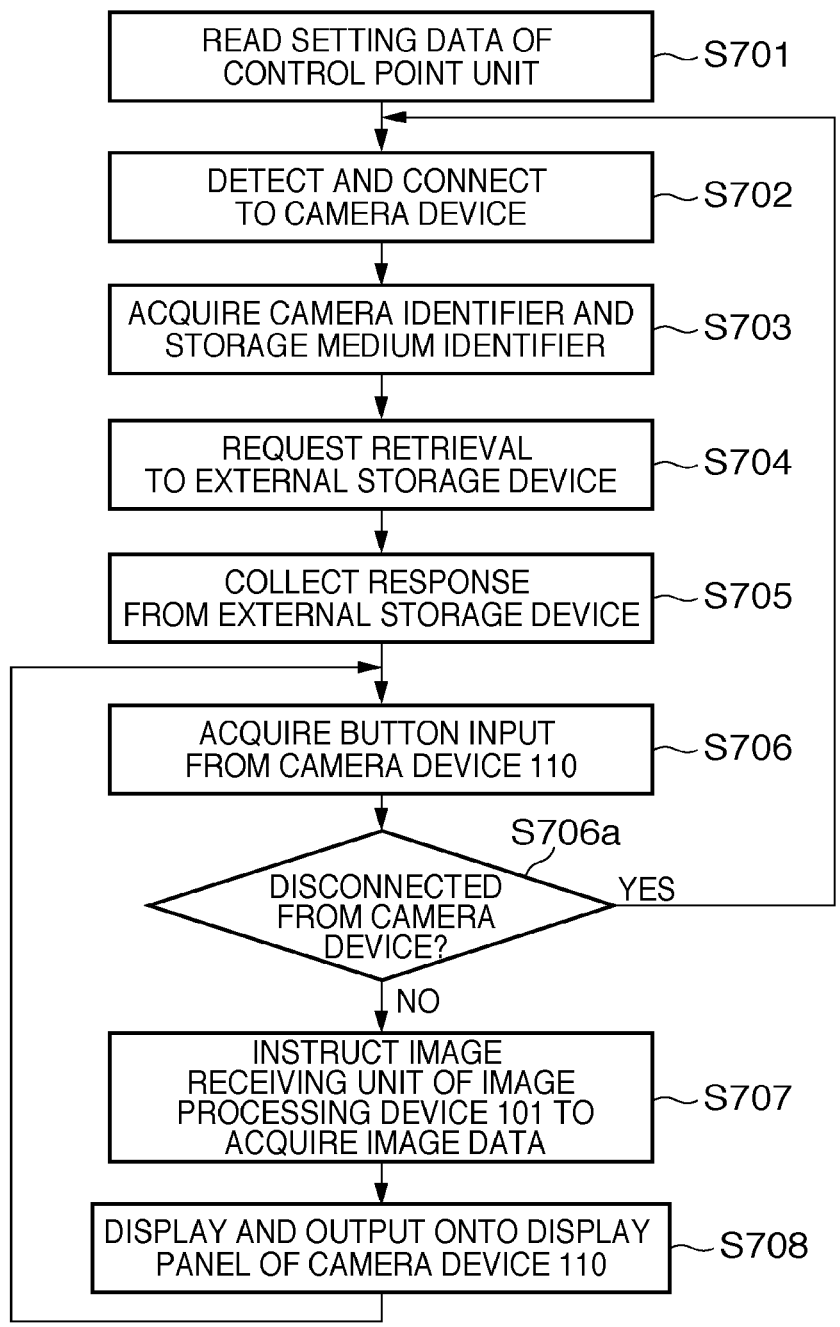
FIG. 7 is a flowchart showing an operation of a control point unit of the image processing device.

Hereinafter, an operation of each functional unit will be described with reference to the drawings. FIG. 7 is a flowchart showing an operation of the control point unit of the image processing device 101. The control point unit receives a message (input operation message) corresponding to a user operation input from the input unit of the camera 110, and operates a device on the network. Here, the input operation message includes identification information about an operated button, and identification information about image data selected by a button operation.

The control point unit initially reads out operation setting information about the control point unit from a specific file (a system database, such as a registry (in some OSs) or the like), and starts an operation based on the read operation setting information, during activation (step S701).

Next, in step S702, the control point unit 101a detects a connected camera, and establishes connection with the camera so as to transmit and receive a button input of the camera and various pieces of information. If a camera is not detected, the control point unit 101a waits for detection of a camera.

Next, in step S703, the control point unit 101a acquires a camera identifier, owner information and a storage medium identifier (identification information about a removable storage medium, such as a memory card) from the connected camera.

Next, in step S704, the control point unit 101a retrieves image data captured by the camera from image data stored in an external storage device on a network to which the image processing device 101 is connected.

In this embodiment, the control point unit 101a transmits a request for retrieval to the external storage device 103. The retrieve request includes, as retrieval conditions, information, such as a camera identifier, owner information about a camera, a storage medium identifier, and the like.

Next, in step S705, the control point unit 101a collects a response from the external storage device 103 with respect to the retrieve request. The response includes attribute information about image data (an image type, a shooting date, a resolution, a data size, parameters during shooting, a duration, a frame rate, and a bit rate), a thumbnail image acquisition path (URL), and an image data body acquisition path (URL). Note that the response may be collected in divided portions at a plurality of times.

Next, in step S706, the control point unit 101a receives an input operation message corresponding to a user's button input from the camera 110. Here, the button input is identified as a cross button (direction button), a PictBridge button, a menu button, a shutter button or the like that are provided on the camera. Disconnection with the camera is detected in step S706a, though it is not a button input. If the disconnection with the camera is detected (YES in step S706a), the processing returns to step S702. If the disconnection with the camera is not detected (NO in step S706a), the processing procceds to step S707.

In step S707, in response to a user's button input, the control point unit 101a sends a request to the image receiving unit of the image processing device 101 so as to acquire image data other than image data stored in the image storing unit of the camera 110.

When this image data acquisition is requested, the thumbnail image acquisition path (URL) or the image data body acquisition path (URL) acquired in step S705 is used.

In this case, the control point unit issues an instruction to acquire a required amount of image data or preread, depending on a display content or a screen layout.

Here, the acquisition of a required amount of image data means, for example, acquisition of a thumbnail image that is directly referenced in a display content or a screen layout, of the image data included in the retrieval response collected in step S705. The preread means acquisition of the image data body of a thumbnail image referenced in a display content or a screen layout prior to a user's instruction. In response to this instruction, the image receiving unit as an external image acquiring means prereads image data, or acquires image data in divided amounts, as appropriate.

Next, in step S708, the control point unit 101a controls the display unit so that a display content corresponding to a button input is output to the display panel of the camera. In this case, as image data that is a portion of the display content, image data stored in the image storing unit of the camera 110 or image data acquired by the image receiving unit of the image processing device 101 is selectively used, depending on selection of image data by a button input of the camera 110 (FIG. 17).

Also, a thumbnail image or an image data body is selectively used, taking a layout on the display panel into account. Next, the process returns to step S706 so as to receive the next button input. Note that if disconnection with the camera is detected in step S706, the process is interrupted and returns to step S702. Next, the control point unit 101a waits for detection of connection of a camera.

Figure 17:
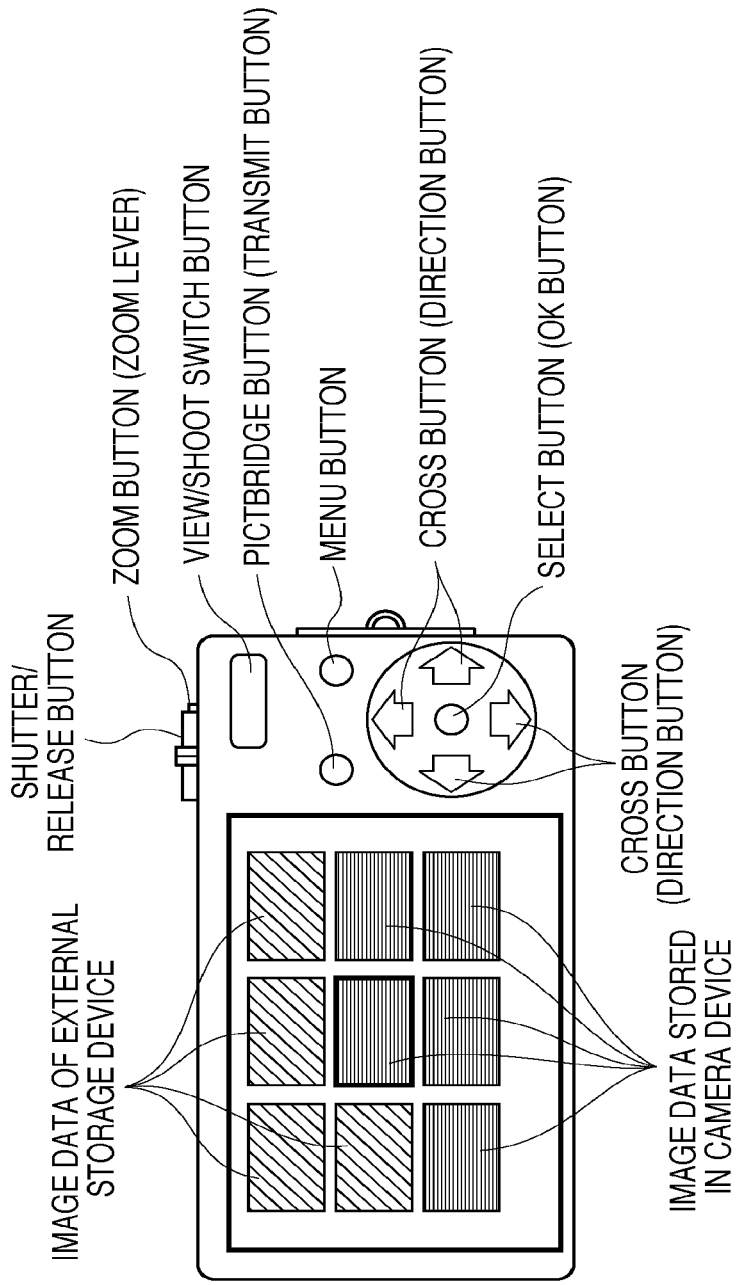
FIG. 17 is a diagram for describing exemplary button arrangement and display of a camera device.

As described above, the button input of the camera 110 of this embodiment is interpreted by the control point unit of the image processing device 101 (FIG. 17). When image data is listed and displayed, then if a zoom button (tele side) is operated, the image data is enlarged and displayed. When the zoom button (wide side) is operated, a plurality of pieces of image data are listed and displayed. In this case (list display), pieces of image data collected in step S705 are arranged and displayed under display conditions (e.g., in order of date).

When a cross button (direction button) is operated during the list display, a selected image (focused image) of the pieces of image data listed and displayed is moved rightward, leftward, upward or downward. When a select button is operated during the list display, a selected image (focused image) of the pieces of image data listed and displayed is confirmed, and is then transmitted, printed or erased by a subsequent operation.

Figure 8:
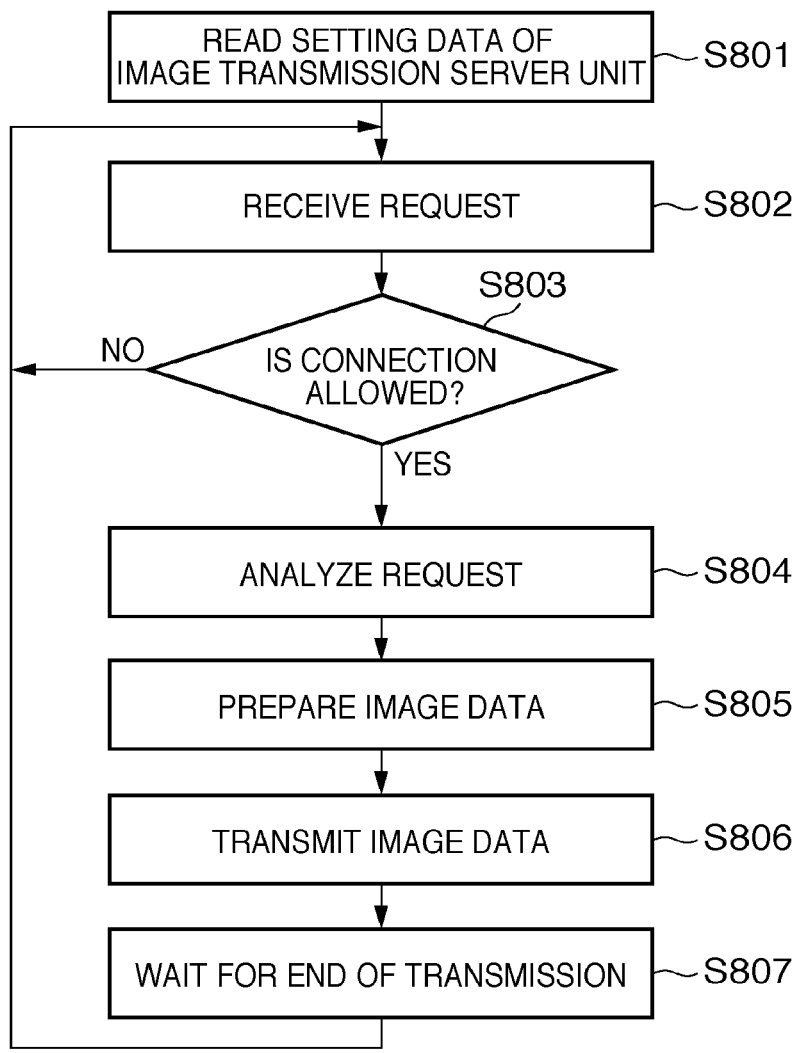
FIG. 8 is a flowchart showing an operation of an image transmission server unit of the image processing device.

FIG. 8 is a flowchart showing an operation of the image transmission server unit of the image processing device 101. The image transmission server unit receives an image transmission request transmitted from a device on the network, and transmits image data corresponding to the request. The image transmission server unit initially reads out operation setting information about the image transmission server unit from a specific file (a system database, such as a registry (in some OSs) or the like), and starts an operation based on the read operation setting information during activation (step S801). Next, based on the setting information, the image transmission server unit opens a communication port for receiving a request from the image reproducing/displaying unit of the display terminal (client).

Next, in step S802, the image transmission server unit receives an image transmission request from a device on the network. When receiving an image transmission request, the image transmission server unit determines whether or not the device is allowed to connect thereto in step S803. If connection is not allowed (NO in step S803), the image transmission server unit transmits an error code indicating refusal of connection as a response to the request source, and returns to S802.

If connection is allowed (YES in step S803), the image transmission server unit goes to step S804 and analyzes the request to specify the type of requested image data or image source information (reference information in the image storing unit of the camera), and also determines a distribution protocol.

Next, the image transmission server unit goes to step S805 and prepares the requested image data. When the requested image data is image data that is accumulated in the connected camera, the requested image data is to be acquired from the camera. Therefore, in this case, the image transmission server unit transmits a request to the image storing unit of the camera to acquire the image data.

Next, in step S806, the image transmission server unit transmits the acquired image data using the requested distribution protocol. Note that the processes of steps S805 and S806 are executed by different threads to perform a pipeline (image streaming) process with respect to partial data of image data, depending on the type of the image data or the distribution protocol. Next, in step S807, after end of transmission of image data, the image transmission server unit returns to step S802 and waits for the next request.

Figure 9:
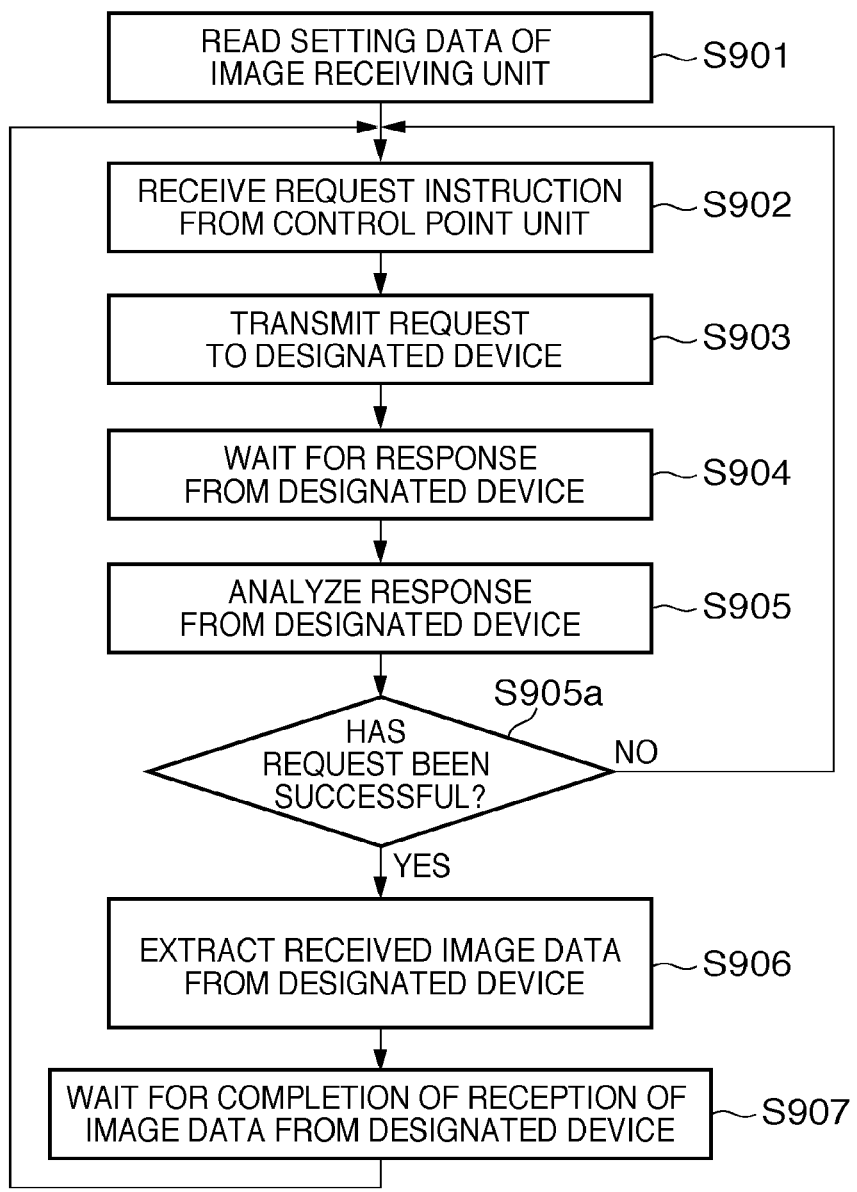
FIG. 9 is a flowchart showing an operation of an image receiving unit of the image processing device.

FIG. 9 is a flowchart showing an operation of the image receiving unit of the image processing device 101. The image receiving unit receives image data transmitted from a device on the network. The image receiving unit initially reads out operation setting information about the image receiving unit from a specific file (a system database, such as a registry (in some OSs) or the like), and starts an operation based on the read operation setting information during activation (step S901).

Next, in step S902, the image receiving unit receives request contents of an image to be received, from the control point unit (step S707). The request contents include identification information about a device on the network that provides image data (specified by an IP address or a uuid), the type of image data, image source information (including identification information or retrieval conditions in a designated device), and a communication protocol. Also, a processing method for the image to be received is designated in the request contents.

Next, in step S903, the image receiving unit establishes connection with the designated device on the network that provides image data in accordance with the request contents, and transmits a request for acquisition of the image data using the designated communication protocol. For example, the image receiving unit connects to the external storage device 103, and transmits an image acquisition request (ftp-get request) using an ftp protocol.

Next, in step S904, the image receiving unit waits for a response from the designated device, and then receives the response. When receiving the response, the image receiving unit goes to step S905, and analyzes the response. Based on the result of the analysis, in step S905a, the image receiving unit determines the success or failure of the request, a response transmission method, a response size, or the like.

When the request has failed (NO in step S905a), the image receiving unit returns to step S902, and gets ready for the next image receiving process. When the request has been successful (YES in step S905a), the image receiving unit goes to step S906, and extracts received image data from the contents of response. The received image data may be extracted in divided amounts at a plurality of times.

The image receiving unit transfers the extracted image data to the control point unit. Typically, the extracted image data is used in step S708 of the control point unit and is transferred to the display unit of the camera 110.

Next, in step S907, the image receiving unit waits for completion of reception of image data, and then returns to step S902 and gets ready for the next image receiving process. It has been described above that the image receiving unit issues an image acquisition request to a device on the source's side. Alternatively, the control point unit may issue the request. In this case, steps S902 and S903 are removed, and the process is performed from step S904.

Figure 10:
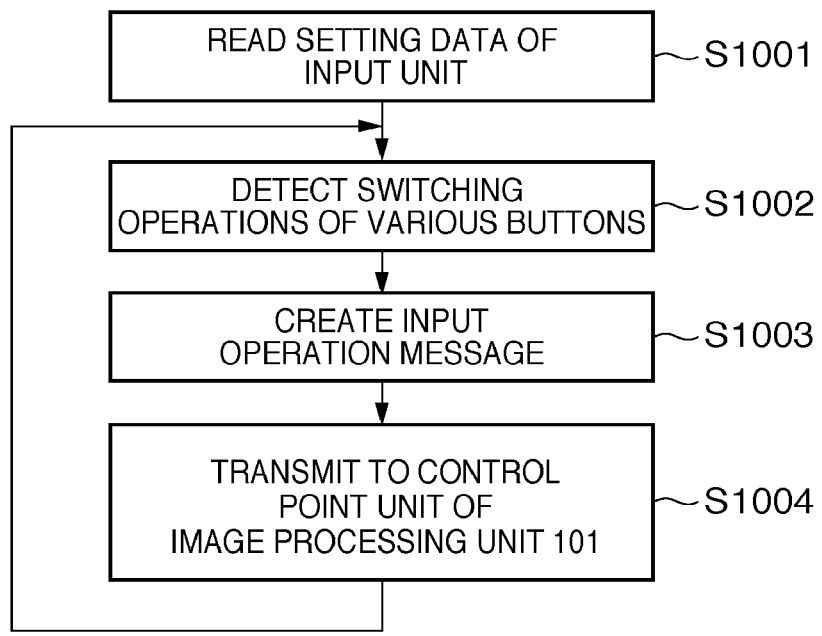
FIG. 10 is a flowchart showing an operation of an input unit of the camera.

FIG. 10 is a flowchart showing an operation of the input unit of the camera 110. The input unit of the camera 110 receives an input that is entered by the user using a corresponding button of the camera 110, and transfers the input to the control point unit of the image processing device 101. The input unit 110a of the camera 110 works after USB connection with the image processing device 101 is established. The processes of various button operations before USB connection are similar to those of a typical camera.

The input unit of the camera 110 initially reads out operation setting information about the input unit from a specific file (a system database, such as a registry (in some OSs) or the like), and starts an operation based on the read operation setting information (step S1001).

Next, in step S1002, the input unit detects various button operations performed on the camera 110. Next, in step S1003, the input unit creates an input operation message corresponding to the detected button operation.

Next, in step S1004, the input unit transmits the created input operation message to the control point unit of the image processing device 101. The input unit then returns to step S1002 so as to wait for the next button input.

Figure 11:
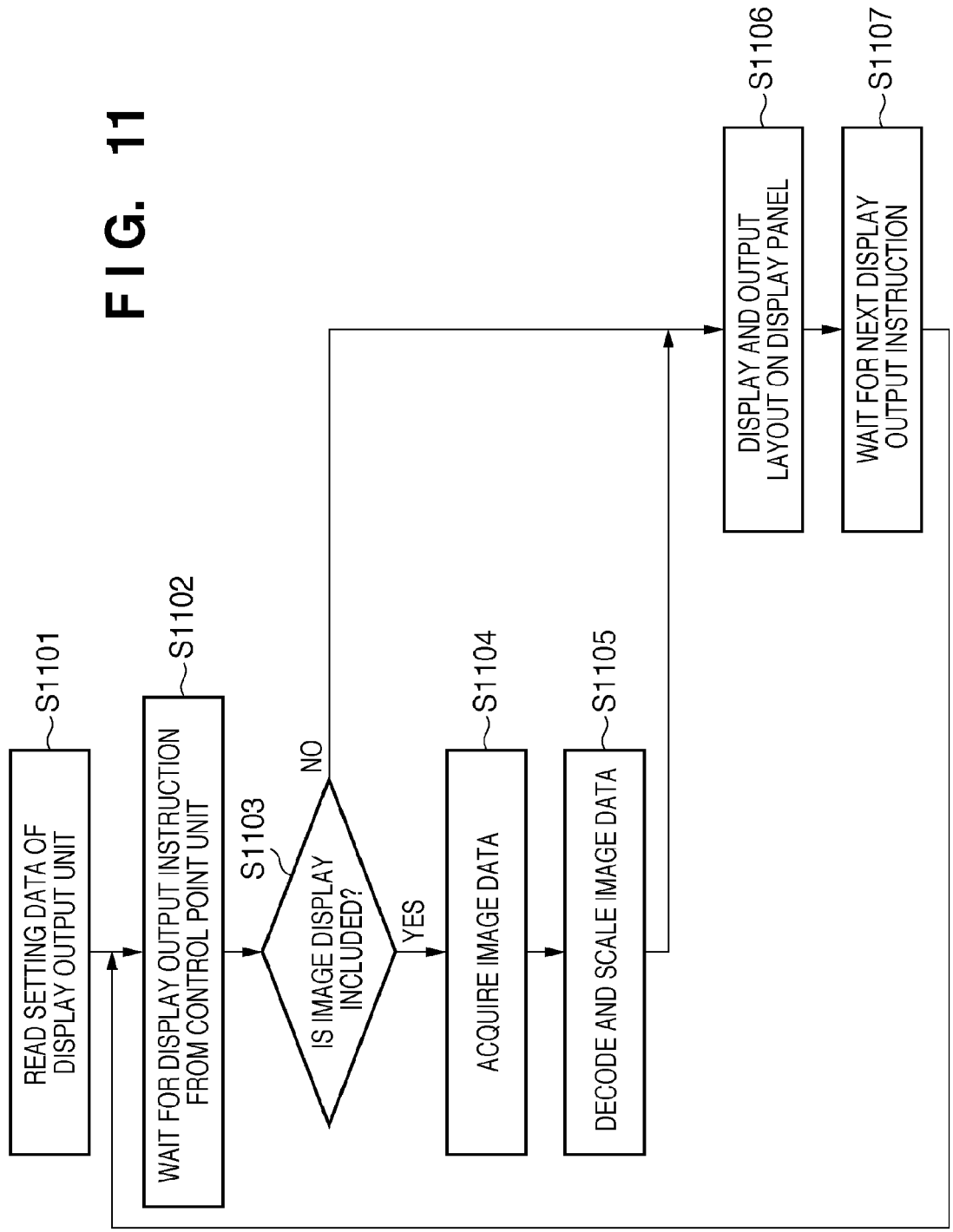
FIG. 11 is a flowchart showing an operation of a display unit of the camera.

FIG. 11 is a flowchart showing an operation of the display unit of the camera 110. The display unit of the camera 110 is controlled by the control point unit of the image processing device 101 so that data, such as a designated text or graph or the like, is output to and displayed on the display panel of the camera 110.

The display unit of the camera 110 works after USB connection with the image processing device 101 is established. The display process to the display panel before USB connection is similar to that of a typical camera. The display unit of the camera 110 initially reads out operation setting information about the display unit from a specific file (a system database, such as a registry (in some OSs) or the like), and starts an operation based on the read operation setting information (step S1101).

Next, in step S1102, the display unit waits for a display instruction from the control point unit of the image processing device 101. When receiving the display instruction, the display unit goes to step S1103, and determines whether or not an image data display instruction is included in the received display instruction.

When an image data display instruction is included in the received display instruction (YES in step S1103), the display unit acquires image data from the image receiving unit of the image processing device 101 or the image storing unit of the camera 110 (step S1104). Next, in step S1105, the display unit decodes and optionally scales the acquired image data in accordance with the display instruction.

Next, in step S1106, the display unit outputs layout data including image data to the display panel of the camera 110 in accordance with the display instruction (FIG. 17). Next, in step S1107, the display unit 110b returns to step S1102 so as to wait for the next display instruction.

In step S1106, the display unit may display an acquisition source of the image data acquired in step S1104, depending on acquisition source information about the image data, in a manner that allows the acquisition source to be distinguished from others. Specifically, a display means of the image processing device can output and display image data acquired from the camera or other devices on the network, in a form that allows the acquisition source of the image data to be identified.

Figure 12:
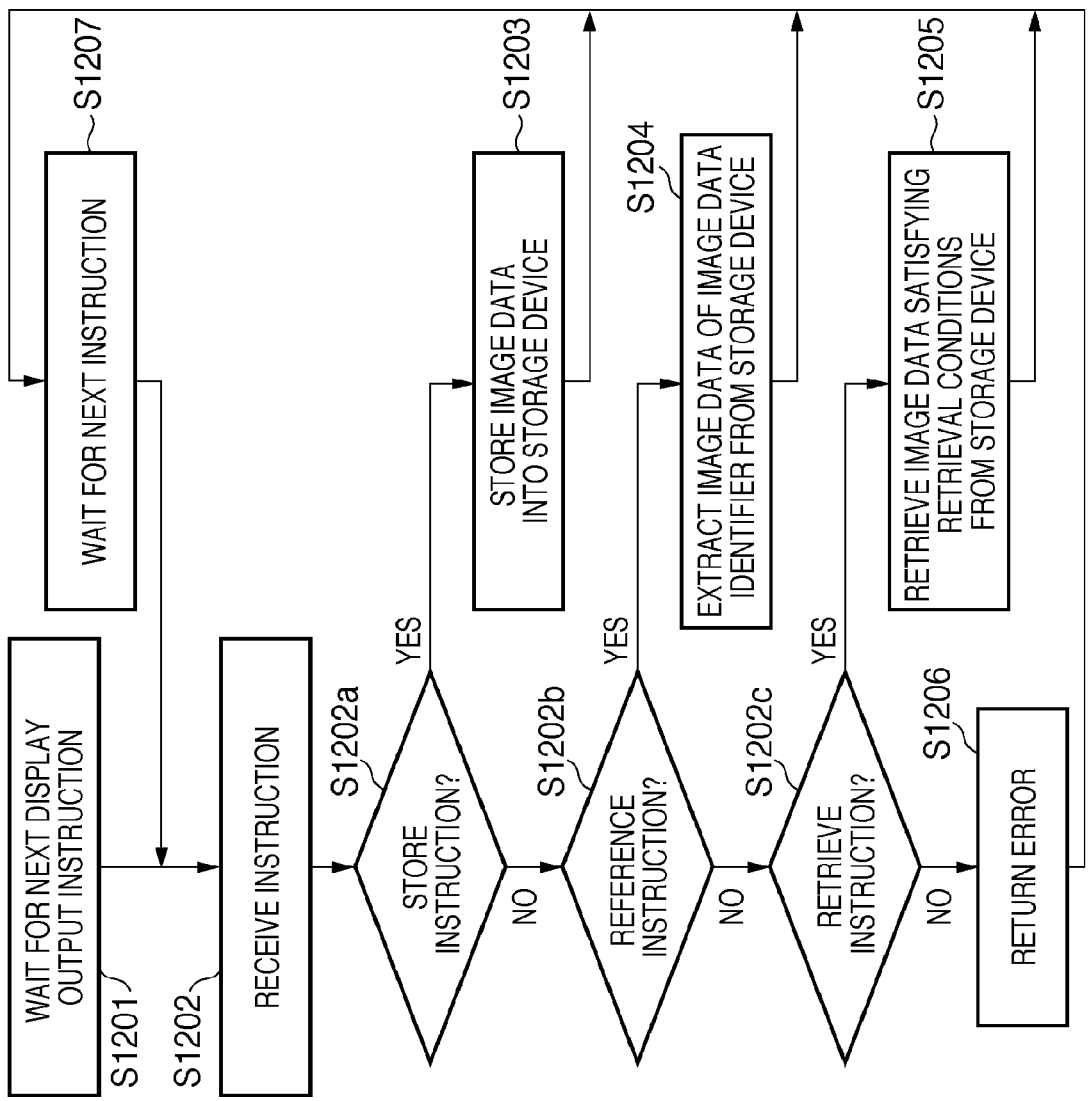
FIG. 12 is a flowchart showing an operation of an image storing unit of the camera.

In FIGS. 5 and 11, the output of audio data is similarly described, though not illustrated. FIG. 12 is a flowchart showing an operation of the image storing unit of the camera 110.

The image storing unit of the camera 110 stores image data received from the image receiving unit of the image processing device 101 or image data captured by the camera 110 to the storage device of the camera 110. The image storing unit of the camera 110 also provides image data stored in the storage device of the camera 110 in response to a request from the image transmission server unit of the image processing device 101 or the display unit of the camera 110.

The image storing unit of the camera 110 works after USB connection with the image processing device 101 is established. A storing/referencing process to the storage device before USB connection is similar to that of a typical camera. The image storing unit of the camera 110 initially reads out operation setting information about the image storing unit from a specific file (a system database, such as a registry (in some OSs) or the like), and starts an operation based on the read operation setting information (step S1201).

Next, in step S1202, the image storing unit receives an instruction to store, reference or retrieve image data. The instruction given to the image storing unit is issued from the control point unit, the image transmission server unit or the image receiving unit of the image processing device 101, or the display unit 110b of the camera 110.

When receiving an instruction to store image data (YES in step S1202a), the image storing unit stores the image data accompanying the store instruction to the storage device, and transmits a response indicating whether or not the storing process has been successful (step S1203). When the storing process has been successful, the transmitted response includes an image data identifier. When receiving an instruction to reference image data (YES in step S1202b), the image storing unit 110c extracts image data corresponding to an image data identifier designated by the reference instruction from the storage device, and transmits the extracted image data as a response (step S1204).

When receiving an instruction to retrieve image data (YES in step S1202c), the image storing unit retrieves image data satisfying retrieval conditions designated by the retrieve instruction from the storage device, and returns the result of the retrieval (a set of image data identifiers) (step S1205). If the instruction is not any of store, reference and retrieve instructions (NO in steps S1202a to S1202c), the image storing unit returns an error (step S1206). Next, in step S1207, the image storing unit returns to step S1202 so as to receive the next instruction.

Figure 13:
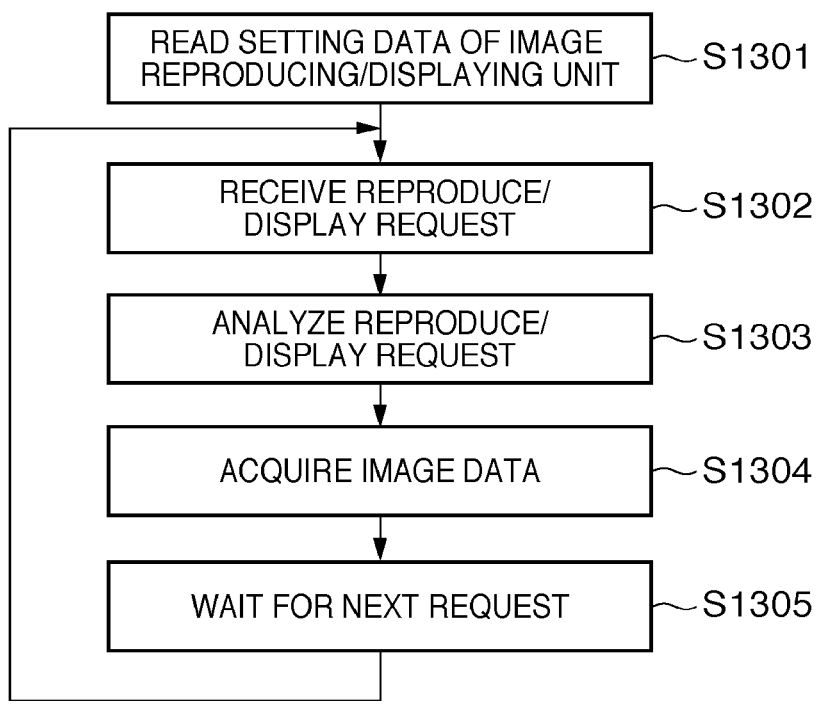
FIG. 13 is a flowchart showing an operation of an image reproducing/displaying unit of the display terminal 102.

FIG. 13 is a flowchart showing an operation of the image reproducing/displaying unit of the display terminal 102. The image reproducing/displaying unit of the display terminal 102 reproduces received image data and outputs and displays the received image data onto the display panel of the display terminal 102.

The image reproducing/displaying unit initially reads out operation setting information about the image reproducing/displaying unit from a specific file (a system database, such as a registry (in some OSs) or the like), and starts an operation based on the read operation setting information during activation (step S1301). Next, the image reproducing/displaying unit 102a opens a communication port for receiving an image reproduce/display request from the control point unit of the image processing device 101 (client) in accordance with the setting information.

Next, in step S1302, the image reproducing/displaying unit receives a reproduce/display request. Next, in step S1303, the image reproducing/displaying unit analyzes the reproduce/display request to extract information about a destination device for storing image data to be reproduced, and an image data identifier.

Next, in step S1304, the image reproducing/displaying unit acquires image data from the image data storing destination device based on the extracted information. When the image data storing destination device is the image processing device 101, the image reproducing/displaying unit acquires image data from the image transmission server unit of the image processing device 101. When the image data storing destination device is the external storage device 103, the image reproducing/displaying unit 102a acquires image data from the image storing unit of the external storage device 103.

Next, in step S1304, the image reproducing/displaying unit decodes and optionally scales the image data based on attribute information about the image data included in the reproduce/display request, a display parameter, and a parameter included in the image data itself, and outputs the resultant image data to the display panel. Next, in step S1305, the image reproducing/displaying unit 102a returns to step S1302 so as to receive the next request.

Figure 14:
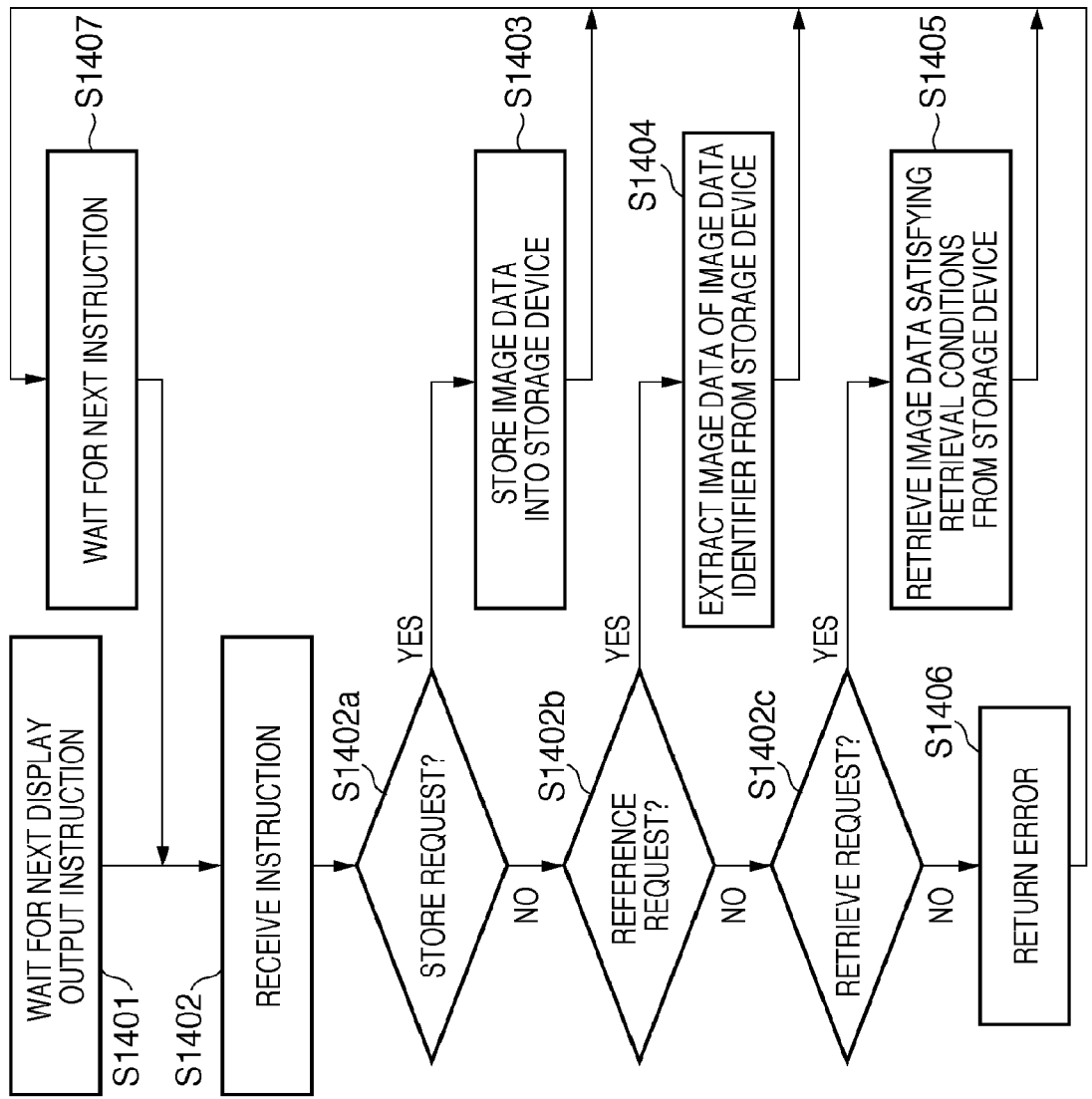
FIG. 14 is a flowchart showing an operation of an image storing unit of the external storage device 103.

FIG. 14 is a flowchart showing an operation of the image storing unit of the external storage device 103. The image storing unit of the external storage device 103 appropriately stores image data so as to process each of a store request, a reference request and a retrieve request from other devices on the network.

The image storing unit initially reads out operation setting information about the image storing unit from a specific file (a system database, such as a registry (in some OSs) or the like), and starts an operation based on the read operation setting information during activation (step S1401). Next, the image storing unit opens a communication port for receiving a request from a device on the network in accordance with the setting information.

Next, in step S1402, the image storing unit receives a request from a device on the network. The request provides an instruction to either store, reference or retrieve image data. If the request is a store request (YES in step S1402a), the image storing unit receives image data accompanying the store request, and stores the image data into the storage device of the external storage device 103 (step S1403). Next, the image storing unit transmits a response indicating the success or failure of the storing process to the client. If the storing process has been successful, the response including an image data identifier is transmitted.

If the request is a reference request (YES in step S1402b), the image storing unit extracts image data corresponding to the image data identifier designated by the reference request from the storage device, and transmits the extracted image data as a response (step S1404). If the request is a retrieve request (YES in step S1402c), the image storing unit retrieves image data satisfying retrieval conditions designated by the retrieve request from the storage device, and transmits the result of the retrieval (a set of image data identifiers) (step S1405).

If the request is not any of store, reference and retrieve requests (NO in steps S1402a to S1402c), the image storing unit returns an error (step S1406). Next, in step S1407, the image storing unit 103a returns to step S1402 so as to receive the next request.

With the above-described configuration, in an image processing device on a network, image data stored in a storage area of a camera and image data stored in an external storage device can be transmitted to a display terminal in similar manners.

Particularly, in this embodiment, by using a camera user interface, such as a display panel, a button, a zoom lever or the like, provided on a camera connected to an image processing device, image data to be operated is selected, transmitted, printed or the like. Although it has been described in this embodiment that image data is displayed on the display terminal 102, the output destination is not limited to a display terminal. For example, image data may be transmitted to a printer device, which in turn prints and outputs the image data. Also, image data stored in an external storage device may be transmitted and stored in a camera. In this embodiment, image data stored in an external storage device is temporarily received by an image processing device before being transmitted to a display device. In this case, the image processing device may temporarily store the image data acquired from the external storage device only when a camera is connected. If the camera is disconnected, the acquired image data may be erased. Thereby, when another camera is connected to the image processing device, image data captured by the previously connected camera can be prevented from being erroneously displayed on the other camera. Also, every time a camera is disconnected, image data temporarily stored is erased. Therefore, the memory 1014 of the image processing device can be effectively used.

Although it has been described in this embodiment that a retrieve request is transmitted to the external storage device 103 in step S704, a retrieve request may be transmitted to a plurality of devices. Note that an image processing device may simultaneously acquire image data from a plurality of devices connected to a network.

Figure 15:
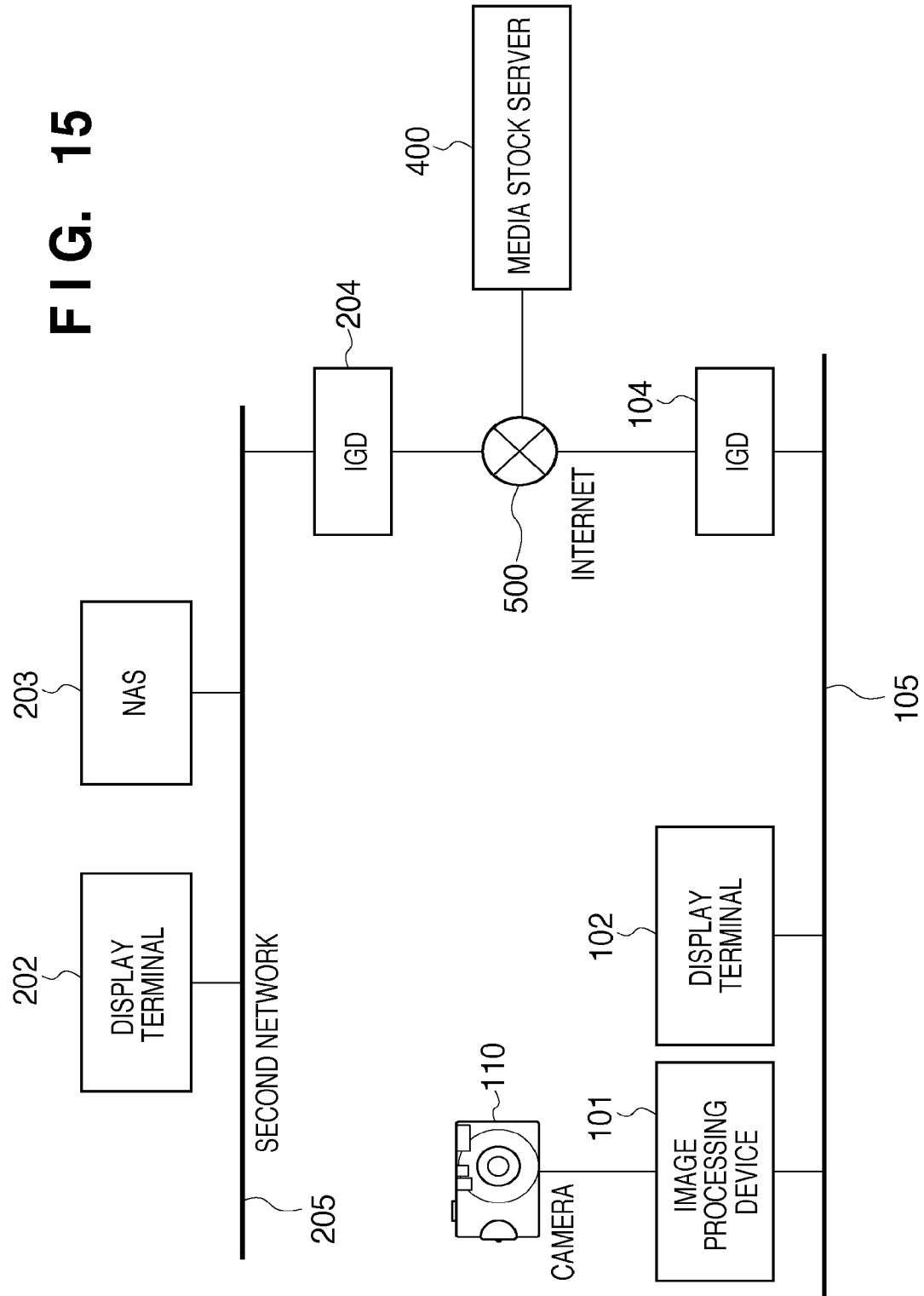
FIG. 15 is a diagram showing another usage configuration of the first embodiment.

Moreover, a device from which image data is to be retrieved is not limited to an external storage device and may be any device that can hold and transmit image data. For example, a device from which image data is to be retrieved may include a second image processing device. For example, a device from which image data is to be retrieved may be an image storing device (server) that is connected to the Internet, such as a media stock server 400 shown in FIG. 15. In FIG. 15, the image processing device 101 is connecting to the INTERNET 500 via the Internet Gateway Device (IGD) 104.

In this case, a method for designating a thumbnail image acquisition path (URL) or an image data body acquisition path (URL) that is received in step S705 uses, for example, the domain name of the image storing device (server) connected to the Internet and an image data identifier in the server.

Also, a method for connecting an external storage device is not limited to a network 105. For example, as shown in FIG. 15, an external storage device may be connected to a second network 205. In FIG. 15, the external storage device (NAS: Network Attached Storage) 203 and a display terminal 202 are connecting to the second network 205, and also connecting to the INTERNET 500 via the Internet Gateway Device (IGD) 204.

A thumbnail image acquisition path (URL) or an image data body acquisition path (URL) received in step S705 may include, for example, remote access identification information for identifying an Internet Gateway Device (IGD) on the second network or user authentication information. The following is an example. ftp://taro:kiyanon@xxx.yyy.zzz/directory/photo/8576523

Figure 16:
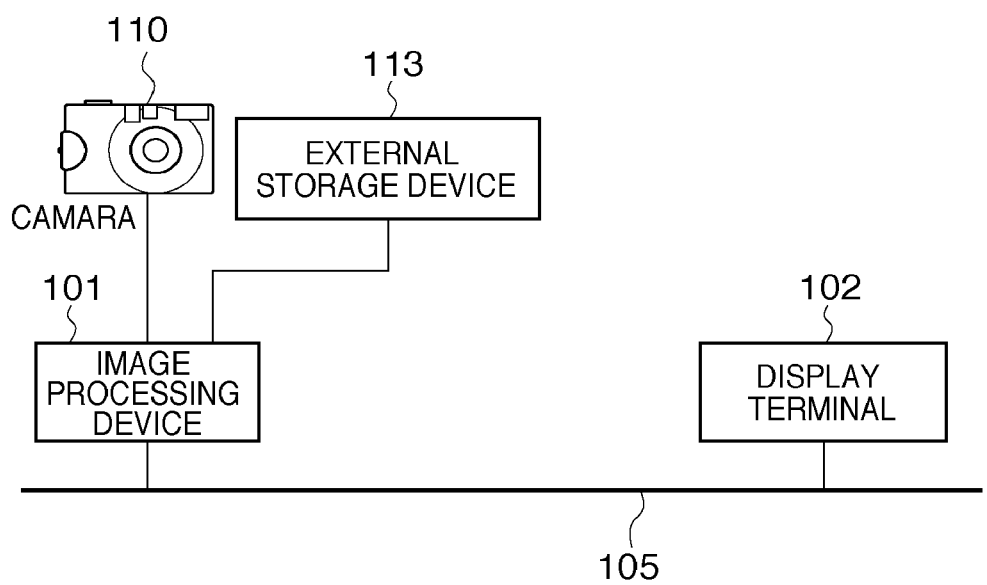
FIG. 16 is a diagram showing still another usage configuration of the first embodiment.

For example, as shown in FIG. 16, an external storage device 113 may be directly connected to the image processing device 101. In this case, the external storage device is a USB connection storage device. In this case, a thumbnail image acquisition path (URL) or an image data body acquisition path (URL) received in step S705 may be of other formats. For example, if "file" may be used to designate a connection protocol instead of "http" or "ftp", an image data acquiring method can be identified as that which is performed via local connection (other than network connection). The following is an example.

file:///dev/hda2/media/photo/8576523

Although it has been described in this embodiment, for the sake of simplicity, that the image transmission server unit of the image processing device 101 sequentially processes received requests, it can be contemplated that a plurality of requests are processed in parallel.

It has also been described in this embodiment that a button input to the camera 110 is interpreted and executed by the control point unit of the image processing device 101, the method for interpreting and executing a button input to the camera 110 is not limited to this.

For example, the camera 110 may interpret a button input, and transmit the button input as a logical command to the control point unit of the image processing device 101. In this case, a portion of the functions of the control point unit of the image processing device 101 may also be possessed by the input unit of the camera 110.

A second embodiment is a technique of using an image processing device provided on a network to transmit image data stored in a storage area of a camera and image data stored in an external storage device to a display terminal in similar manners, as in the first embodiment.

Particularly, in this embodiment, a camera 111 has a network connecting function that is provided by the image processing device 101 in the first embodiment, so that the camera can be directly connected to a network.

In this embodiment, most of the hardware configuration and the software operations are the same as those described in the first embodiment. Note that the second embodiment is different from the first embodiment in the network connection form of FIG. 1, the hardware configuration of the camera described in FIG. 5, and the functional configuration described in FIG. 6.

Figure 18:
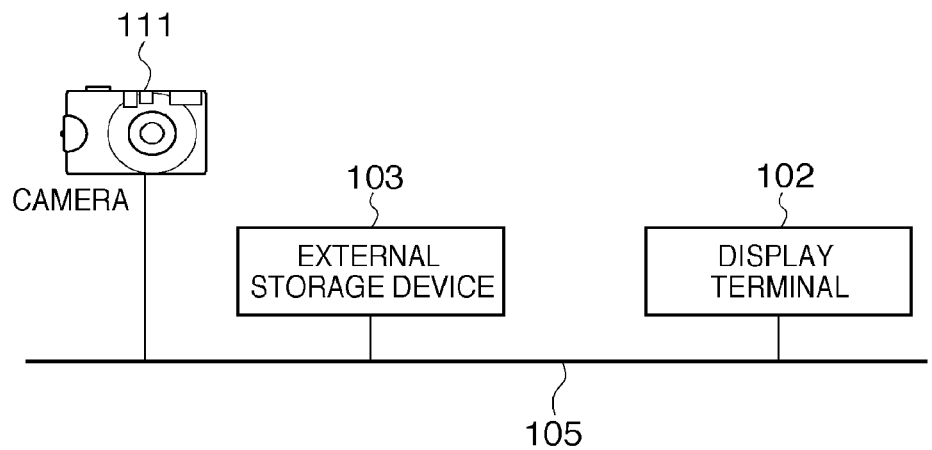
FIG. 18 is a diagram showing an example usage configuration in a second embodiment.
Figure 19:
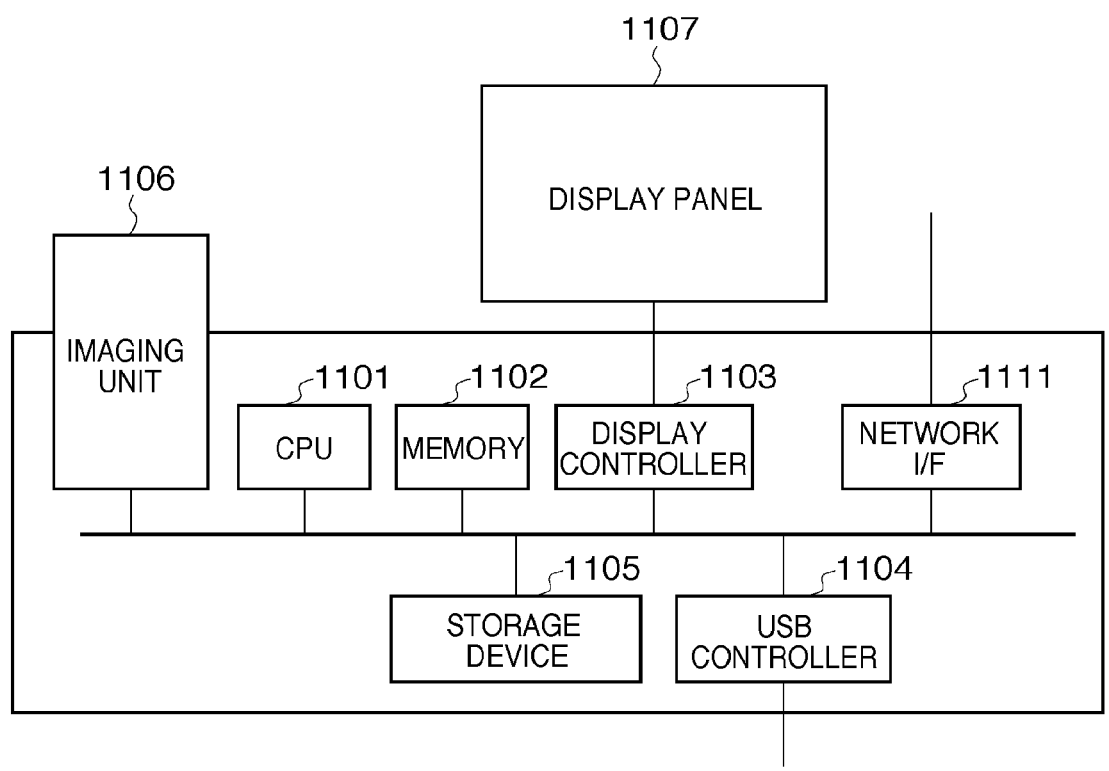
FIG. 19 is a diagram showing an exemplary hardware configuration of a camera in the second embodiment.
Figure 20:
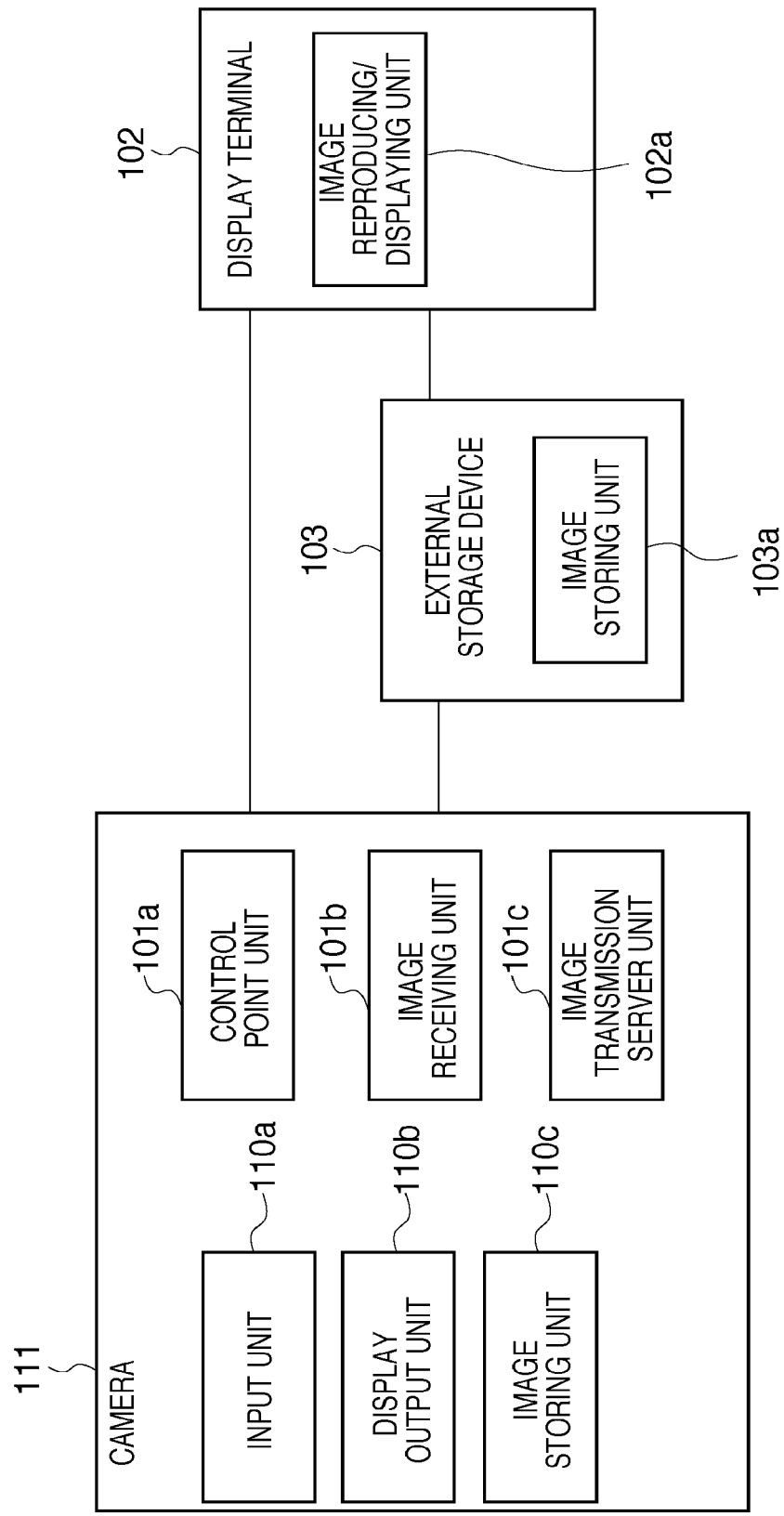
FIG. 20 is a diagram schematically showing a program configuration in the second embodiment.

FIG. 18 is a diagram showing a typical usage configuration in the second embodiment, which is different from FIG. 1 in the camera 111 is directly connected to a network. FIG. 19 is a diagram showing an exemplary hardware configuration of the camera 111 in the second embodiment, which is different from FIG. 5 in that a network I/F 1111 for connecting to the network is provided. FIG. 20 is a diagram schematically showing a program configuration in the second embodiment, which is different from FIG. 6 in the program configuration of the camera 111.

The camera 111 comprises the input unit 110a, the display unit 110b and the image storing unit 110c that are included in the camera 110, and in addition, the control point unit 101a, the image receiving unit 101b and the image transmission server unit 101c that are included in the image processing device 101.

The operation of each functional unit of the camera 111 is similar to that of the first embodiment, except that transfer of a command or data between devices via a USB in the first embodiment is performed within the camera 111.

With the above-described configuration, in an image processing device provided on a network, image data stored in a storage area of a camera and image data stored in an external storage device can be transmitted to a display terminal in similar manners, as in the first embodiment.

Particularly, in this embodiment, the network connection function provided by the image processing device 101 in the first embodiment is possessed by the camera 111. Therefore, the camera 111 can be directly connected to a network.

Image data stored in an external storage device can be operated in a manner similar to that for image data stored in a camera, by a user interface that uses buttons included by the camera. Therefore, it is not necessary to make efforts to learn a new operation and it is also possible to avoid confusion, resulting in an intuitive operation.

Some embodiments of the present invention have been described above. The present invention may be applied to either a system including a plurality of devices or a system including only one device.

Note that the present invention is carried out as follow. A computer program that provides the functions of the above-described embodiments is directly or remotely supplied to a system or a device. The system or device reads out and executes program codes. Therefore, program codes themselves that are installed in a computer so as to carry out the functional processes of the present invention in the computer fall within the technical scope of the present invention.

In this case, the form of the program is not particularly limited as long as the functions of the present invention are achieved. Examples of the program form include object codes, a program executed by an interpreter, script data supplied to an OS, and the like.

Examples of a recording medium for supplying the program include a floppy (registered trademark) disk, a hard disk, an optical disc, a magneto-optical disc, an MO, a CD-ROM, a CD-R, a CD-RW, a magnetic tape, a nonvolatile memory card, a ROM, a DVD (DVD-ROM, DVD-R, etc.), and the like.

In addition, an Internet site may be accessed using a browser of a client PC to download the program of the present invention itself or a file having an automatic installing function into a recording medium, such as a hard disk or the like. Alternatively, program codes constituting the program of the present invention may be divided into a plurality of files, which are then downloaded from different websites. In other words, the program for executing the functional processes of the present invention on a computer may be downloaded to a plurality of users by a WWW server. Such a WWW server also falls within the scope of the present invention.

Also, the program of the present invention may be encrypted before being stored into a storage medium, such as a CD-ROM or the like, which is in turn distributed to a user. Key information for decryption may be downloaded from a website via the Internet to a user that meets predetermined conditions, and the key information may be used to execute the encrypted program to install the program in a computer.

Also, based on the instructions of the program, an OS working on the computer may execute the whole or a part of actual processes, which achieves the above-described functions of the embodiments.

Moreover, the program of the present invention may be written in a memory of a function expansion unit of a PC, and a CPU included in the function expansion unit may execute the whole or a part of actual processes. This also falls within the scope of the present invention.

According to the present invention, a technique of directly and simply operating image data stored in an external storage device using an imaging device can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image capturing device connectable to an external storage device on a network, comprising:
   a retrieve request transmitting unit configured to transmit a retrieve request, the retrieve request including as retrieval conditions an identifier associated with the image capturing device, to the external storage device for acquiring first image data related to the identifier stored in the external storage device;
   a receiving unit configured to receive, from the external storage device, acquisition path information for acquiring the first image data related to the identifier as a response to the retrieve request;
   a first memory configured to store second image data;
   an acquisition unit configured to acquire, using the acquisition path information received by the receiving unit, the first image data related to the identifier from the external storage device; and
   a display control unit configured to display the first image data acquired by the acquisition unit and the second image data stored in the first memory on a display unit,
   wherein at least one of the retrieve request transmitting unit, the receiving unit, the acquisition unit, or the display control unit is implemented by a processor and at least one of the first memory or a second memory.

2. The image capturing device according to claim 1, wherein the acquisition unit acquires the first image data corresponding to a layout of image data on the display unit from the external storage device.

3. The image capturing device according to claim 1, wherein the acquisition unit pre-reads image data.

4. The image capturing device according to claim 1, wherein the acquisition path information includes a first uniform resource locator (URL) for acquiring the first image data and a second URL for acquiring a thumbnail image of a first image, and
wherein the acquisition unit is configured to acquire, using the first URL and the second URL, the first image data and the thumbnail image of the first image.

5. A method of controlling an image capturing device connectable to an external storage device on a network, the method comprising:
   transmitting a retrieve request, the retrieve request including as retrieval conditions an identifier associated with the image capturing device, to the external storage device for acquiring first image data related to the identifier stored in the external storage device;
   receiving, from the external storage device, acquisition path information for acquiring the first image data related to the identifier as a response to the retrieve request;
   acquiring, using the received acquisition path information, the first image data related to the identifier from the external storage device; and
   displaying the acquired first image data and second image data stored in a memory of the image capturing device on a display unit.

6. A non-transitory computer-readable storage medium storing a program for causing a computer to execute a method of controlling an image capturing device connectable to an external storage device on a network, the method comprising:
   transmitting a retrieve request, the retrieve request including as retrieval conditions an identifier associated with the image capturing device, to the external storage device for acquiring first image data related to the camera identifier stored in the external storage device;
   receiving, from the external storage device, acquisition path information for acquiring the first image data related to the identifier as a response to the retrieve request;
   acquiring, using the received acquisition path information, the first image data related to the identifier from the external storage device; and
   displaying the acquired first image data and second image data stored in a memory of the image capturing device on a display unit.

* * * * *